March 7, 1933.　　　L. R. BROWN　　　1,900,042
CALCULATING MACHINE
Filed Aug. 1, 1929　　　8 Sheets-Sheet 1

Inventor
Lee R. Brown
by E.W. Anderson & Son
Attorneys

March 7, 1933.　　　L. R. BROWN　　　1,900,042
CALCULATING MACHINE
Filed Aug. 1, 1929　　　8 Sheets-Sheet 3

Inventor
Lee R. Brown.
by E.W. Anderson ofon
Attorneys.

March 7, 1933.     L. R. BROWN     1,900,042
CALCULATING MACHINE
Filed Aug. 1, 1929     8 Sheets-Sheet 4
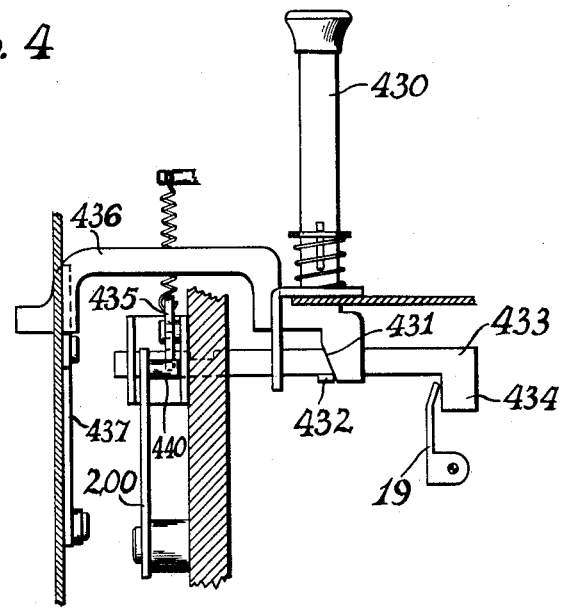
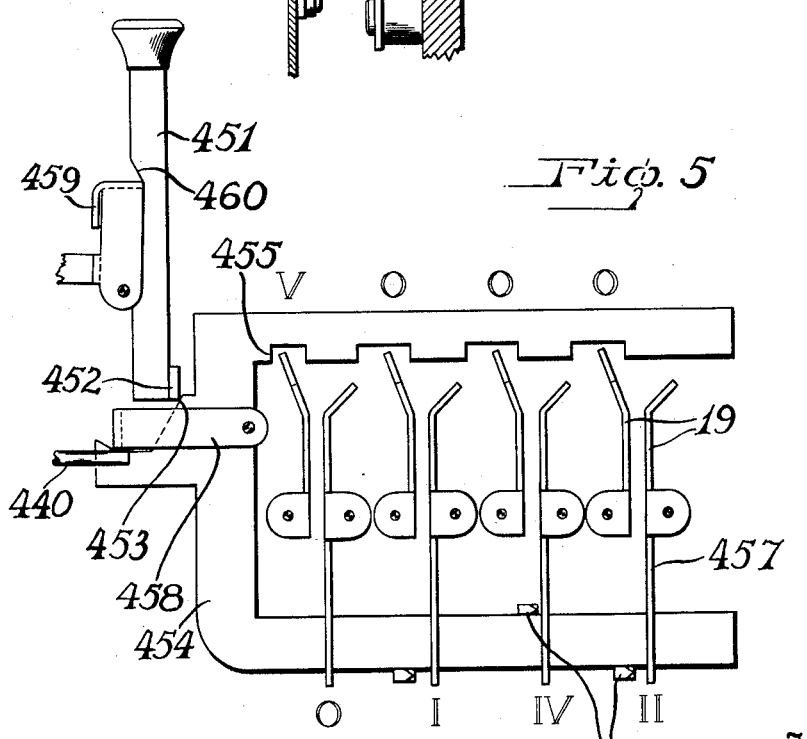
Inventor.
Lee R. Brown.
by E. W. Anderson
Attorneys.

March 7, 1933.   L. R. BROWN   1,900,042
CALCULATING MACHINE
Filed Aug. 1, 1929    8 Sheets-Sheet 5

Inventor.
Lee R. Brown
by E. W. Anderson Son
Attorneys.

March 7, 1933.  L. R. BROWN  1,900,042
CALCULATING MACHINE
Filed Aug. 1, 1929  8 Sheets-Sheet 8
Fig. 9
Fig. 10
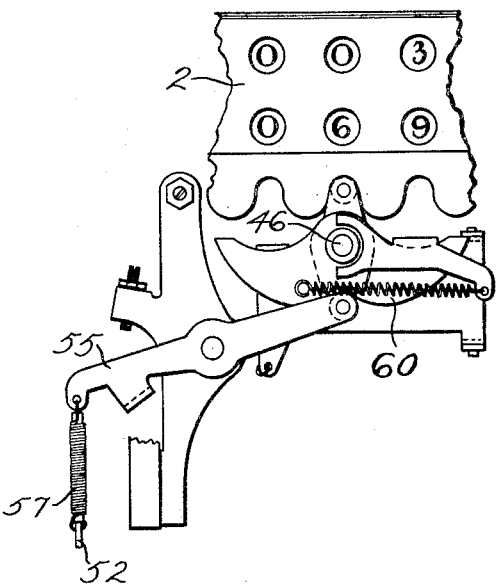
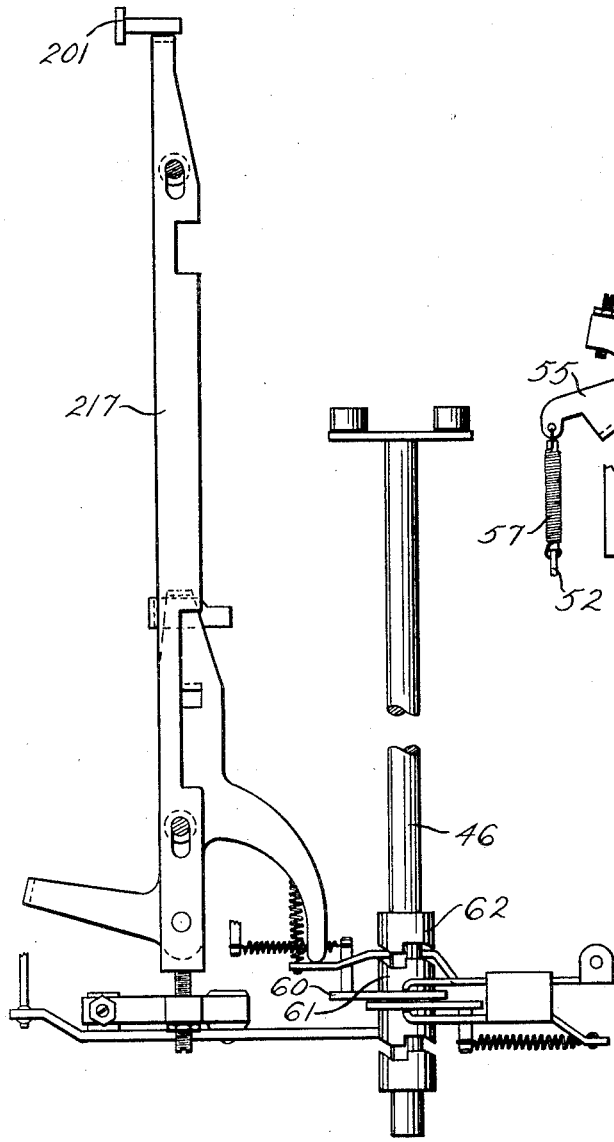
INVENTOR
Lee R. Brown.
BY  E. W. Anderson
ATTORNEY Patented Mar. 7, 1933

1,900,042

UNITED STATES PATENT OFFICE

LEE R. BROWN, OF EAST ORANGE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed August 1, 1929. Serial No. 382,792.

The invention relates primarily to improved means for employing the method of multiplication described in the co-pending application Number 346,686, filed by George C. Chase, on March 13, 1929, and issued as Patent No. 1,827,837 on Oct. 20, 1931, wherein a multiplier is complementally registered in the numeral wheels and thereafter divided by one, this operation serving to control the registration of a product, from a multiplicand set in the keyboard.

The invention is further useful in dividing by a special divisor of one or more figures when either method of division, described in said Chase patent, is employed, and in connection with double operations, wherein multiplication and division are carried out simultaneously. Details of the invention are of still wider application.

Essentially, the invention comprises keyset mechanism for installing an amount in a decimal order keyboard and for simultaneously initiating a registering operation. The invention consists in the novel construction and combination of parts, as set forth in the appended claims.

In the accompanying drawings, illustrating the invention:

Fig. 4 is a detail cross-section, showing the multiplier key and associated parts;

Fig. 5 is a similar view, showing a reciprocal key and associated parts;

Fig. 9 is a detail plan view of the parts controlling the carriage shifting clutch.

Fig. 10 is a detail front elevation of the carriage shifting mechanism.

Figure 1:
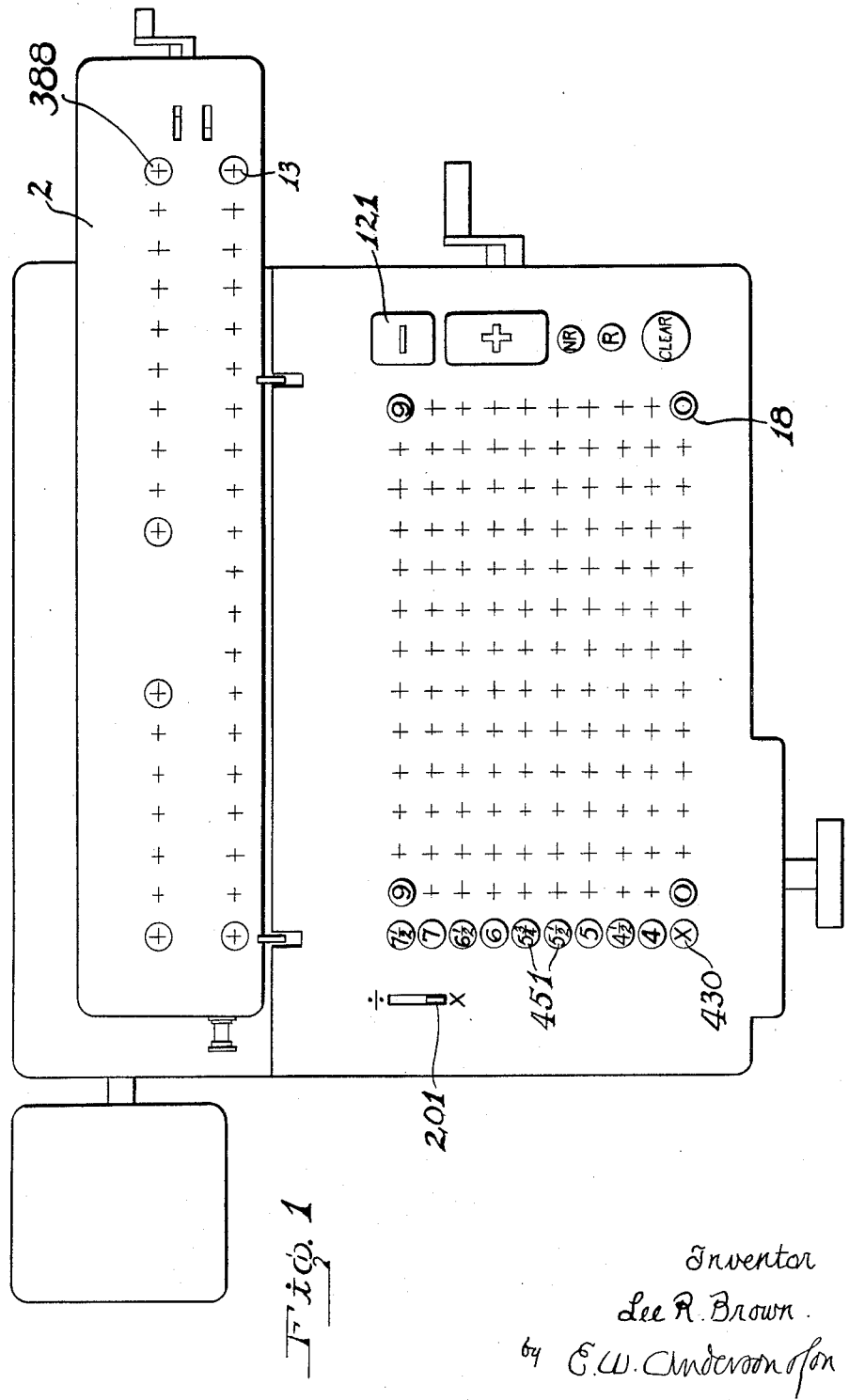
Fig. 1 is a plan view of a calculating machine to which the invention has been applied.

The present invention is designed to simplify the operation described in the above noted Patent Number 1,827,837, involving developments of the mechanism shown in Patent No. 1,888,161, issued on Nov. 15, 1932 to G. C. Chase, and entitled "Automatic control for calculating machines". The improvements illustrated in application Number 213,637 filed by G. C. Chase, August 17, 1927, and entitled "Division stop mechanism for calculators", are also included in the present showing. Other mechanical features disclosed in Patent No. 1,878,757 issued to G. C. Chase, Sept. 20, 1932, and entitled "Decimal equivalent selector mechanism", are also included in the present application in modified form.

According to the disclosures of the above-named patents and application, and of the well-known Monroe calculating machine to which they relate, amounts set up on the keyboard 18, and thereby through selector bails 19, upon the well-known two-part selector gears, are registered upon numeral wheels 13 mounted in carriage 2, upon operation of the machine. This operation is performed by means of electrically-operated drive mechanism fully disclosed in the above-noted applications.

According to the present invention, a multiplier key is provided which has three functions; the setting of a value in the keyboard; the starting of a registering operation; and the setting of means for controlling the operation.

As shown, the multiplier key 430 has a cam foot 431 (Fig. 4) adapted to engage lug 432 of setting slide 433 and to move said slide laterally. The free end of the slide is provided with a lug 434 engaging one of the bails 19 related to the left-hand bank of decimal keys 18. The movement imparted to the slide by cam 431 is sufficient to set the bail 19 and the related selector gear section into position to register one upon one of the numeral wheels 13. A spring latch 435, operable as hereinafter described, serves to hold the setting slide 433 in adjusted position, and permits the key 430 to be restored by its spring as finger pressure thereon is removed.

Figure 3:
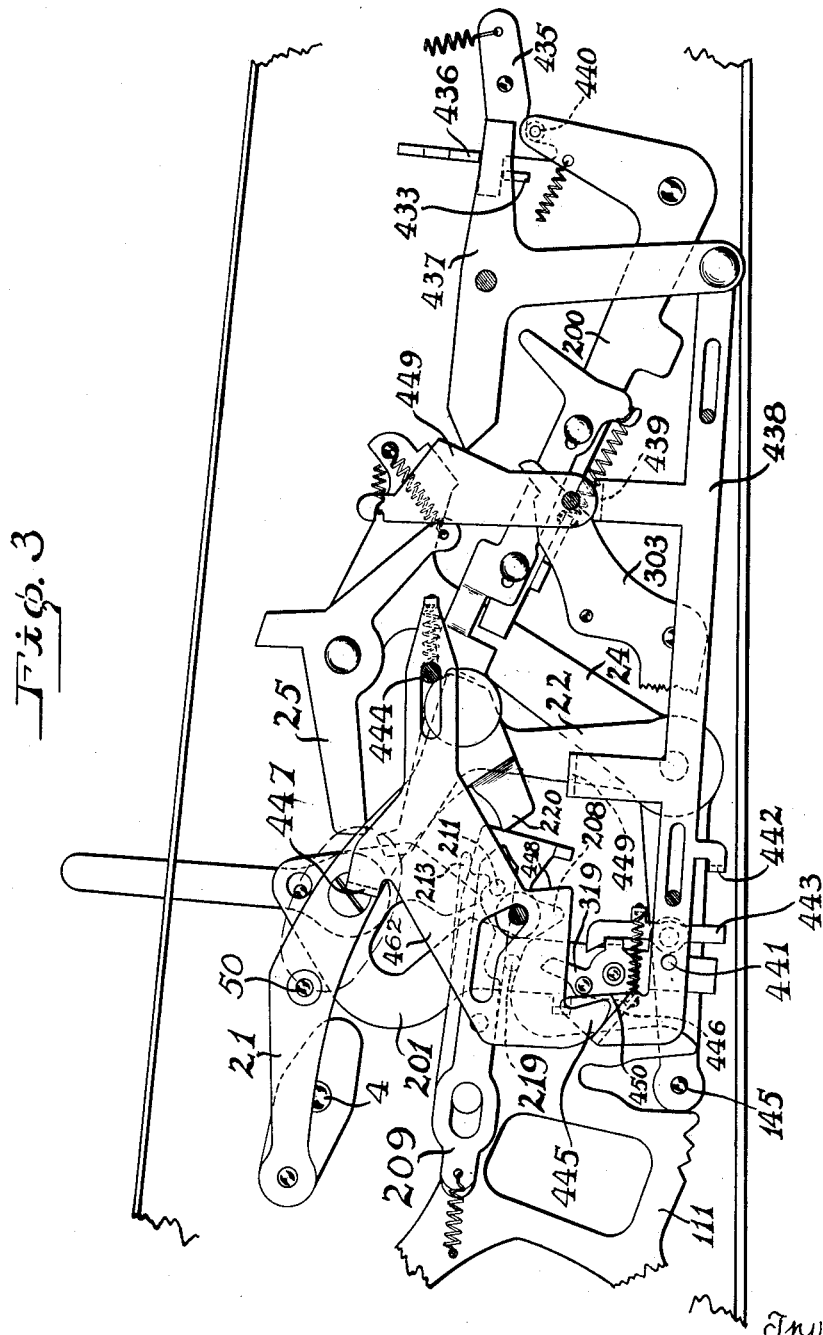
Fig. 3 is an enlarged detail side view of certain parts appearing in Fig. 2.

The multiplier key 430 is provided with a lateral extension 436 overlying one arm of the bell lever 437 (Fig. 3), the other arm of which is pivotally connected to a slide bar 438. This bar has a lug 439 engaging a latch lever 303, designed to raise lock lever 200 and to latch it in raised position upon depression of multiplier key 430. Lock lever 200 in rising frees the operating means of the machine by removing a stop from the path of movement of rock arm 22, connected by link 21 with the shaft 4 carrying the selector gears. The same movement of lock lever 200 removes a roller 440 from contact with the spring latch 435, allowing the latch to drop behind a suitable shoulder of the slide 433. Slide bar 438 is provided with a pin 441 which, upon rearward movement of the bar by multiplier key 430, will contact with clutch yoke 111 and move it into additive clutch relation with the planetary gear mechanism described in the Chase Patent 1,566,650. The machine will thus be started in additive operation.

Figure 2:
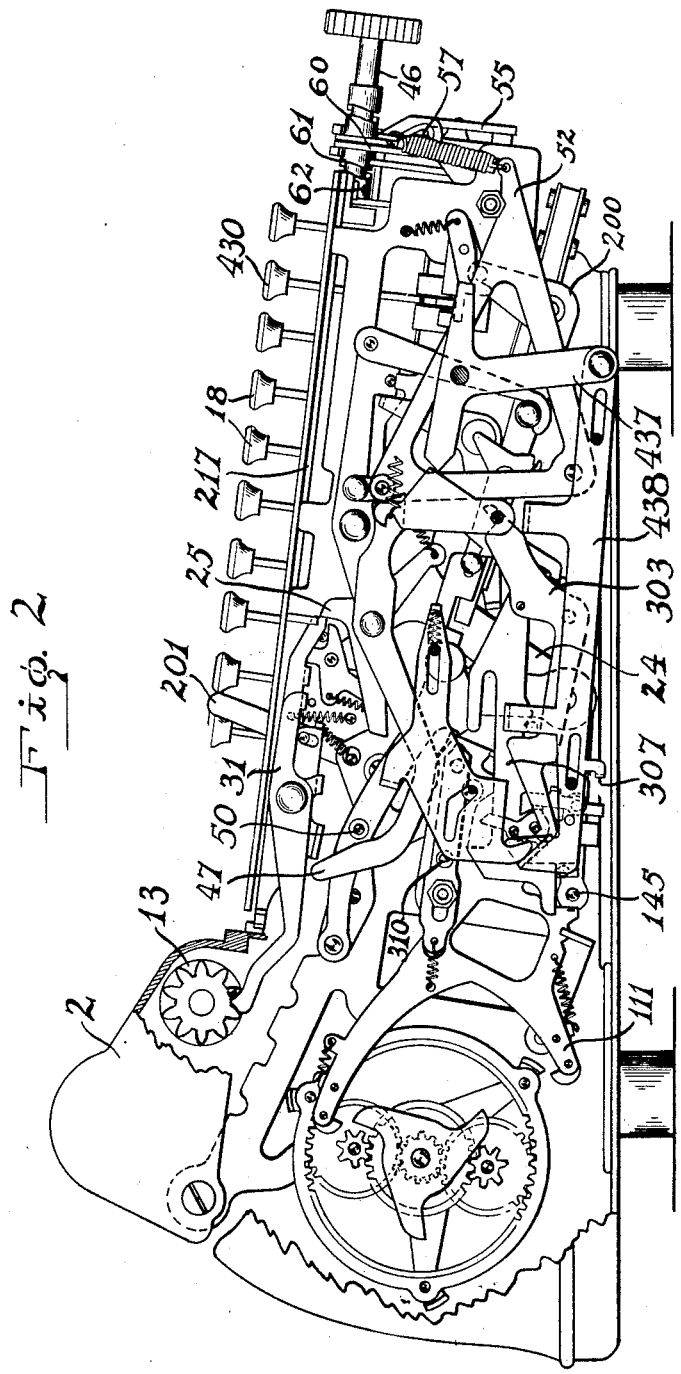
Fig. 2 is a left side elevation of the same with the casing broken away.

The automatic operation of the machine is controlled by a division lever 201, which is designed to be thrown into operative position following the rearward movement of slide bar 438. This division lever, when thrown into operative position by hand in division calculations, is designed to throw clutch yoke 111 into subtractive position, this being accomplished by means of a pawl 319, operable upon a tooth 208 of clutch yoke 111. In order to render pawl 319 inoperative, slide bar 438 is provided with a lug 442, designed in the rearward movement of bar 438 to contact with a latch 443 mounted upon division lever 201 and normally serving to hold pawl 319 in operative position. When freed from latch 443, by operation of lug 442, pawl 319 will be rotated by its spring into a position out of the path of tooth 208 of the clutch yoke. The division lever 201 is automatically thrown into operative position by means of a plate 462 slidably pivoted to the frame of the machine at 444. Plate 462 is normally held in raised position by engagement of the cam portion of a tooth 445 thereof, with a cam face 446 of slide bar 438. As bar 438 is moved rearwardly, face 446, moving over cam portion 445 will allow the plate 462 to drop, bringing lug 447 thereof into the path of movement of a pin 50, mounted on link 21. In the rotation of shaft 4, pin 50 will be carried against lug 447 and will force plate 462 forwardly, carrying the tooth 445 against the pivot pin of pawl 319, and moving division lever 201 into operative position. The forward movement of plate 462 also serves to restore slide bar 438 to normal position, a shoulder 448 of the plate contacting for this purpose with a lug 449 of the slide bar and forcing a suitable tooth of bell lever 437 over the point of a spring locator member 449. Division lever 201 in moving to operative position will engage a pin 211 of sliding tooth 209 mounted on clutch yoke 111, carrying said tooth into forwardly projecting position, where it will be locked by means of a latch 213. This tooth governs the automatic reversal of the selecting gears and other operative elements of the machine in the following manner:

Numeral wheels 13 being rotated until a transitional carry occurs (Patent 1,566,650, operating means) trigger 31 (Fig. 2) will be tripped by a pin on the numeral wheel associated with the highest order carrying mechanism, releasing an element 25 mounted at the end of a stop arm 24, so that element 25 will fall into the path of movement of a lug upon rock arm 22. As the selecting gears pass through their full-cycle position, rock arm 22 will be swung forwardly, carrying therewith stop arm 24, the latter arm being carried against a suitable fixed stop member, and further rotation of the selector gears in the original direction being thus arrested. As stop arm 24 is carried forwardly, a pin 145 mounted upon a rearward extension of said arm will contact with a cam face of clutch yoke 111 and will move said yoke to neutral position, wherein the motor will be disengaged from the calculating devices. The selector gears and other rotating parts of the machine having been arrested by contact of stop arm 24 with the fixed stop, will rebound therefrom, this rebound being assisted by a suitable spring on arm 24, and in this movement a tooth 220 of link 21 will engage the slide tooth 209 and throw clutch yoke 111 in a direction to provide for reverse operation of the machine. At the same time, element 25 striking the end of trigger 31 will be raised out of engagement with the lug of rock arm 22 and the machine will thus be free to continue in operation.

The setting of division lever 201 to active position also effects a clutch governing the automatic shifting of the numeral wheel carriage 2. For this purpose, a member 217 connects the division lever with a clutch hub 61 of division shift cam 60, loosely mounted on the carriage shifting shaft 46. Rotation of shaft 46 will shift numeral wheel carriage 2 by the well-known means employed in the Monroe machine and illustrated in the patents and application hereinbefore referred to. Movement of the division lever to active position will move clutch hub 61 into engagement with a clutch member 62 fast upon shaft 46, so that counter clockwise movement of this shaft, as viewed from the front of the machine, will shift carriage 2 to the left. The shifting impulse is timed and transmitted as follows:

When the selector gears are in full-cycle position, the crank connection of shaft 4 with link 21, is on dead center. As arm 24 is carried against the fixed stop, following additive rotation of the parts, this crank connection will be carried downwardly, in which movement pin 50 will be brought into engagement with the rearward end of a push rod 47, mounted upon arm 24 and having a forward extension adapted to engage one arm of a bell lever 52, being held against the engaging portion of said bell lever by the pin 50. As arm 24 swings forwardly in the direction of the fixed stop, bell lever 52 will thus be rocked and, through connection 57, will move a shifting lever 55, having a roller operating upon cam 60 to impart rotary movement to the clutch hub 61 and shift the carriage.

In the movement of parts 4, 21, and 24, at the conclusion of a subtractive operation, pin 50 will be carried upwardly after the crank connection between shaft 4 and link 21 passes through dead center position, whereby the forward end of push rod 47 will be allowed to pass under the contacting portion of bell lever 52, and no shifting operation will occur.

Alternate forward and reverse operation of the machine will be continued, with shifting of the numeral wheel carriage at the end of each forward operation, until division lever 201 is returned to inactive position, either manually or by well-known means operating automatically when the numeral wheel carriage has advanced to extreme left-hand position. When the division lever is so returned, means will be set whereby the machine will be allowed to complete the registration of the quotient figure which is then being calculated, and will then be brought to rest with all parts restored to normal position.

This means comprises a pin 219 carried by division lever 201, and so arranged that, when the division lever stands in inactive position, and clutch yoke 111 in additive clutch position, latch 213 will be held by said pin out of latching engagement with the pin 211 of sliding tooth 209. Thus, the machine will continue to operate until an additive rotation (which, in division, is a corrective operation designed to counteract a previous excessive subtraction) is completed, whereupon, if the division lever 201 stands in inactive position, latch 213 being tripped and tooth 209 retracted, the end of said tooth will be out of the path of movement of tooth 220 on link 21, and clutch yoke 111 will be left in neutral position.

In the movement of the division lever to inactive position, pawl 319 will strike an extension 450 of slide bar 438, and will be moved thereby into engagement with latch 443. At the same time, locking lever 200 will be released from latch 303 by the following means:

A plate 307, pivoted to latch lever 303, is raised at its rearward end by the upward movement of pin 145 on stop arm 24, as this arm is carried rearwardly in the final arresting operation. Plate 307 being raised by said pin, a cam face of the plate will be brought into contact with pin 310 on the retracted sliding tooth 209, this contact serving to push the plate forwardly and disengage latch lever 303 from locking lever 200, which will thereupon fall under the influence of its spring. As locking lever 200 falls into engaging position, the roller 440 acting upon latch 435 will release slide 433 whereby the left-hand selecting bail 19 will be allowed to return to normal position.

Figure 7:
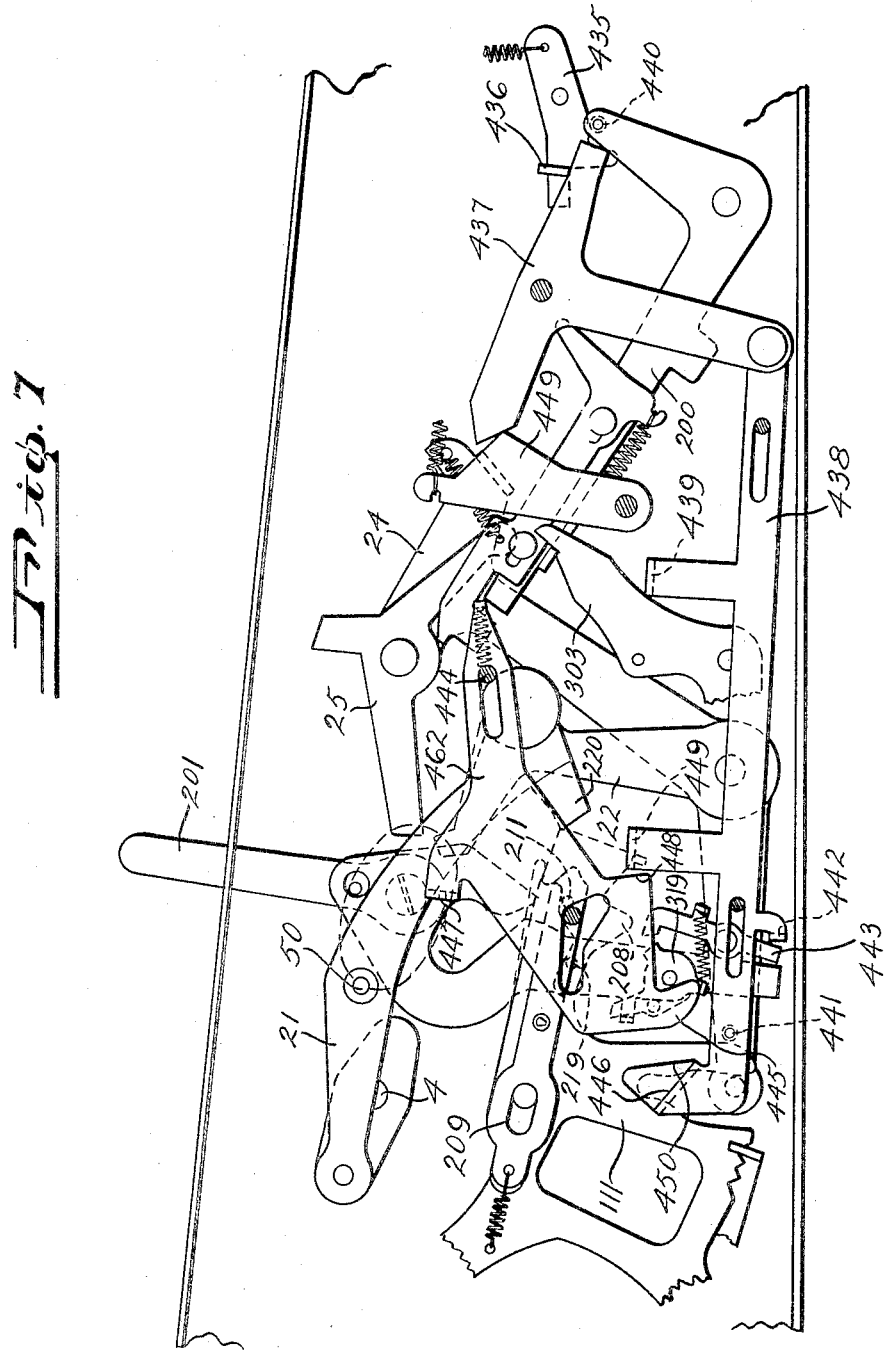
Fig. 7 is a side view, similar to Fig. 3, showing the parts in position taken immediately after the depression of the multiplier key.
Figure 8:
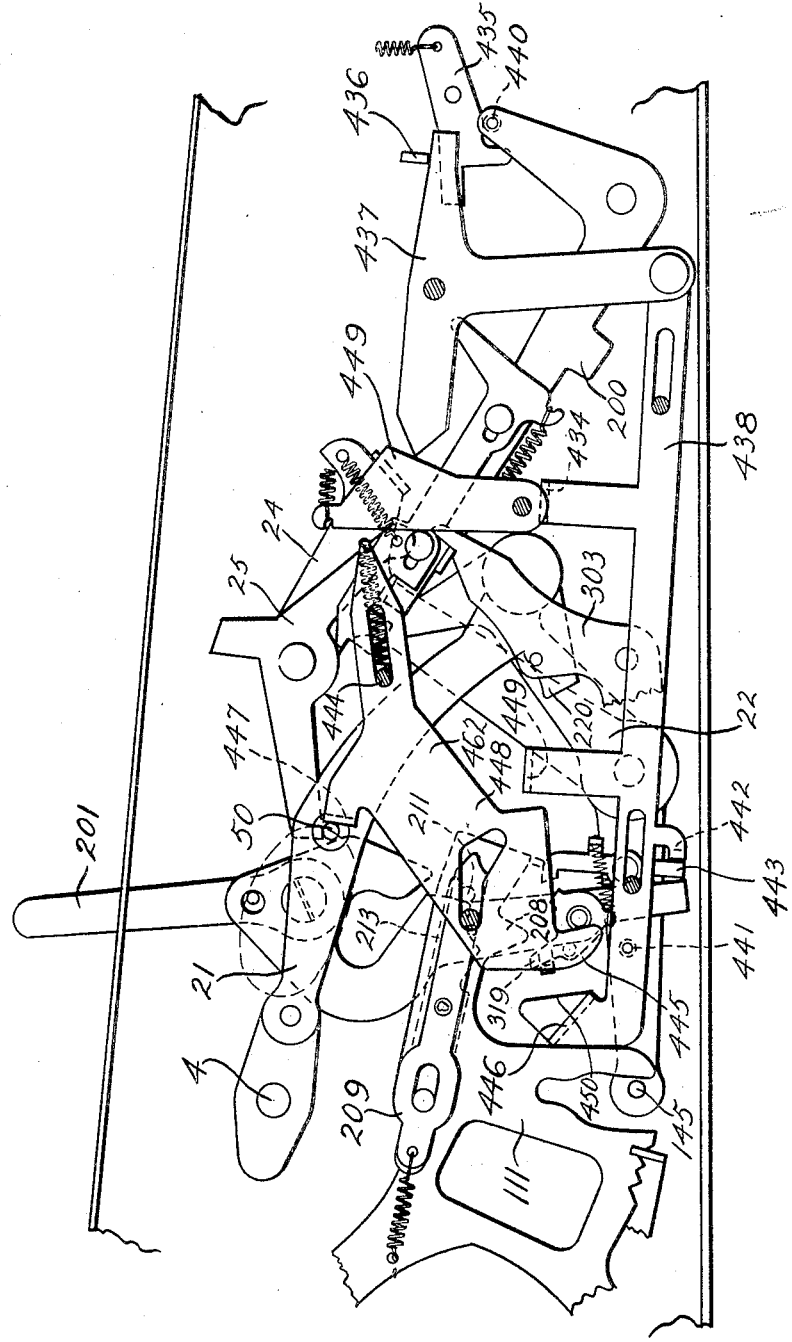
Fig. 8 is a similar view, showing the parts in position taken after the division lever has been thrown automatically into operative position.

*Operation.*—The operation will be described in connection with the multiplication of 23 by 12. 23 being set on the keyboard 18, is registered complementally in the numeral wheels 13 by operation of the well-known subtract key 121; and the counting wheels 388 and keyboard 18 are cleared. The carriage 2 is positioned to bring the first 7 of the registration 99977 in line with the left-hand bank of keys, and 12 is set up in the right-hand keys. Multiplier key 430 is now depressed whereupon three additive rotations of the machine will occur, giving a registration of 36 on the right-hand numeral wheels 13. This operation will change the registration from a negative to a positive amount because the numeral one set up in the left-hand bank of keys by the multiplier key has been added three times to the registration 9997. The transitional carry involved in this operation will act to reverse the direction of rotation of the machine automatically and to shift the carriage 2. This shifting of the carriage serves to bring the figure 7 remaining in the left-hand numeral wheels in line with the left-hand bank of keys and also to advance the 3 registered in the counting wheels 388, to the next higher, or tens place. The machine will now make eight subtractive revolutions whereby the figure 1 set in the left-hand column by the multiplier key 430, will be subtracted eight times from the remaining registration of seven in the left-hand numeral wheels 13 and 96 will be subtracted from the registration 360 in the right-hand numeral wheels 13. At the same time, eight will be subtracted from the 30 registered in the counting wheels 388, and, since these counting wheels are provided with tens carry mechanism, these wheels will now register 22. The transitional carry involved in passing from a left-hand numeral wheel registration of 0007 to 9999 will now automatically reverse the machine, leaving carriage 2 unshifted, whereupon a single corrective additive rotation will be made, clearing the left-hand numeral wheels 13, adding 12 to the 264 registered in the right-hand numeral wheels 13, and adding one to the multiplicand which has been registered in the counting wheels 388; giving a product registration of 276 and a multiplicand registration of 23. The multiplier being still set up in the right-hand keys 18, is indicated by the depressed keys.

The above described operations may be illustrated as follows:

|  | Accumulator wheels | Counting wheels |  |
|---|---|---|---|
| 12×23 + | 997700000<br>3 + 36 | 00<br>+ 3 | First registration |
| − | 000700360<br>8 − 96 | 30<br>− 8 | After positive operation |
| + | 999900264<br>1 ± 12 | 22<br>+ 1 | After negative operation |
|  | 000000276 | 23 | Product and multiplicand |

Figure 6:
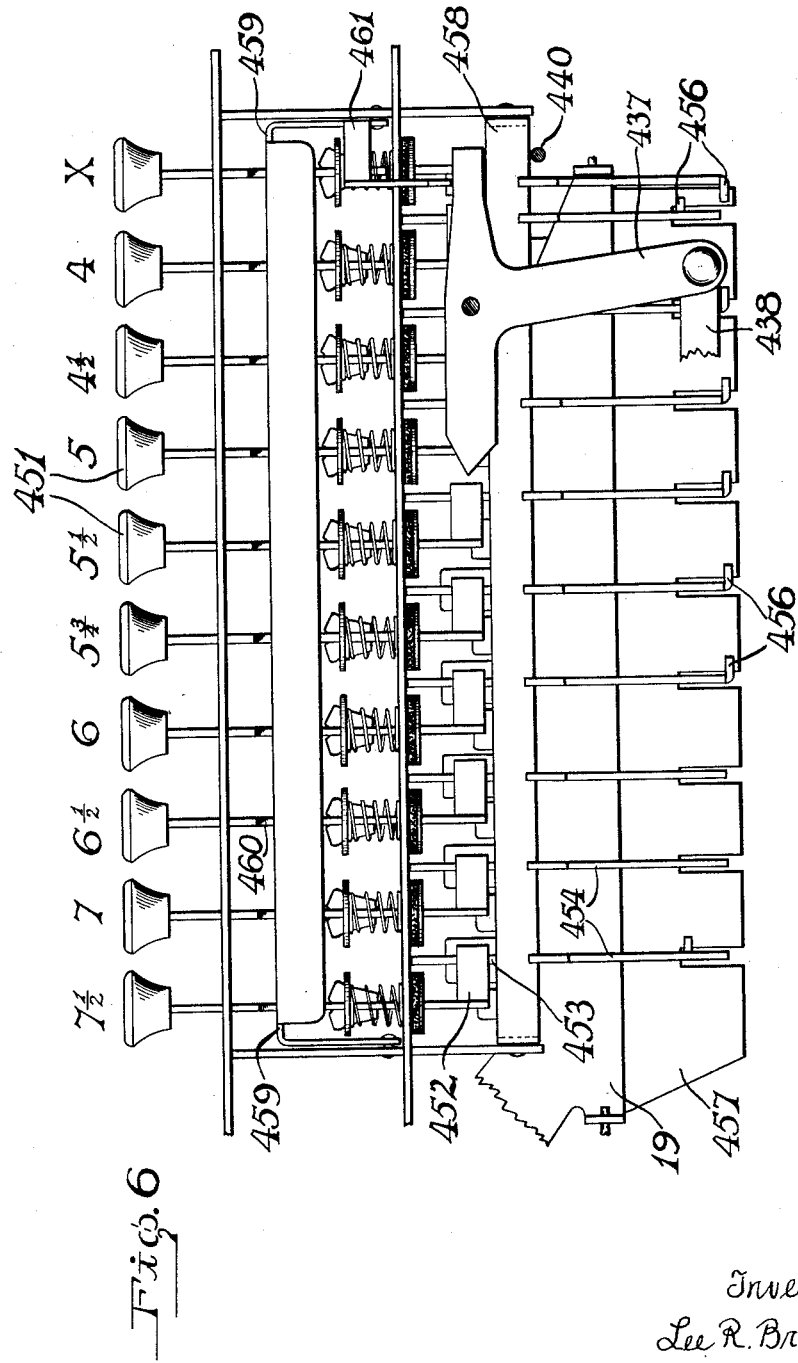
Fig. 6 is a detail side elevation of a bank of reciprocal and multiplier keys and associated parts.

It will be noticed that, by this method, a division has been accomplished simultaneously with a multiplication operation, in a manner similar to that commonly employed in carrying out double operations, and it will be obvious that if special keys are provided (of the character of key 430) whereby amounts other than one may be set up at the left-hand side of the keyboard, a division by a special divisor represented by such key, may be accomplished simultaneously with a multiplication. A series of special keys is illustrated in Figs. 5 and 6, such keys being illustrated as adapted to the figuring of percentages, as in the problem—$15,750.00 at 7½ percent for forty-five days. The special keys, as illustrated, are designed to set up the reciprocals of one day's interest at 4, 4½, 5, 5½, 5¾, 6, 6½, 7, and 7½ percent per annum (360-day basis), that is to say, the amounts 9,000, 8,000, 7,200, 6,545, 6,261, 6,000, 5,538, 5,142, and 4,800. In the problem above mentioned, 15,750 would be registered in wheels 13, as a multiplicand; 45 would be set up in the keyboard 18, as a multiplier, and the 7½% key depressed.

For this purpose, the reciprocal keys 451 are provided with lugs 452 engaging cam faces 453 of slide 454, individual to the keys. These slides are designed to operate upon the bails 19 of a plurality of columns of the selector mechanism. As illustrated, an upper arm of slide 454 is provided with contact faces 455 adapted to engage such of the bails 19 related to the five teeth gear sections as are to be set up. Similarly, contact lugs 456 on the lower arm of slide 454 are adapted to engage lower extensions 457 of the bails 19 related to the 1–4 selector gear sections. Lugs 456 may be spaced at different distances from the pivot points of the bails 19, or they may be spaced from said bails to provide for lost motion, in order to set the bails 19 selectively to bring 1, 2, 3, or 4 teeth of the selector gears into operative position. As illustrated, these two methods of arranging the contact lugs 456 have been combined, so that lost motion will be reduced, without making the extensions 457 of undue length.

A latch 458, similar in function to latch 435, extends along the bank of keys 451 and is operated by pin 440 as hereinbefore described. The keys 451 are adapted to operate the bell lever 437 by means of a bail 459 extending along the key shanks and operable by cam faces 460 thereof. The bail 459 has an extension 461 engaging bell crank 437. As illustrated, the multiplier key, or key setting the number one in the left-hand keyboard column, is associated with the reciprocal keys 451 and is constructed in the same manner as such keys.

It is obvious that any special divisor may be provided for by means of an appropriate key, and that such divisor may be used in any division or double operations desired. It is also to be noted that this invention, whereby the depression of a key will set an amount in the keyboard for registration upon the numeral wheels 13, and will thereafter start the machine in operation; is capable of numerous variations coming within the scope of the invention.

I claim:

1. In a calculating machine having numeral wheels, an item keyboard, and means for repeatedly registering on said numeral wheels selected amounts set in said keyboard; means for setting an amount in the keyboard, and means for initiating and differentially controlling the extent of a plural cycle operation of the registering means, including an operating member common to the setting and the operation initiating and controlling means.

2. In a calculating machine having numeral wheels, an item keyboard, and means for repeatedly registering on said numeral wheels selected amounts set in said keyboard; a key, a lever operable thereby to set the machine in operation, means operable by said key for setting an amount in the keyboard, means for latching the setting means, and automatic means for returning the lever to inoperative position.

3. In a calculating machine having means for installing a dividend in the machine; a key operable to install a divisor and to initiate operation of the machine, and means for automatically controlling such operation to determine and register the quotient.

4. In a calculating machine having an operation control member, and a pawl mounted thereon and adapted to set the machine in operation in a subtractive direction; means for latching said pawl in operative position, and a key operable to set the machine in operation in an additive direction, to unlatch said pawl and to adjust said operation control member.

5. In a calculating machine having an operation control member, and a pawl mounted thereon and adapted to set the machine in operation in a subtractive direction; means for latching said pawl in operative position, means operable to set the machine in operation in an additive direction, to unlatch said pawl and to adjust said operation control member, and automatic means for relatching the pawl.

6. In a calculating machine having an ordinally shiftable carriage, numeral wheels thereon, actuating means for said numeral wheels, and a division lever adapted in operative positon to control automatic reversal of the actuators and automatic shifting of the numeral wheel carriage, and normally operable to set the machine in operation subtractively; a key operable to set the machine in operation additively, and means controlled by said key to set the division lever to operative position.

In testimony whereof I affix my signature.

LEE R. BROWN.